(12) United States Patent
Morton et al.

(10) Patent No.: US 11,513,905 B2
(45) Date of Patent: Nov. 29, 2022

(54) CONTROLLING SEARCH ACCESS TO ASSETS IN A DATA PROTECTION PRODUCT

(71) Applicant: EMC IP Holding Company LLC, Hopkinton, MA (US)

(72) Inventors: James Morton, Adamstown, MD (US); Ming Zhang, Shanghai (CN); Lihui Su, Shanghai (CN); Gerald Jourdain, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 221 days.

(21) Appl. No.: 16/909,263

(22) Filed: Jun. 23, 2020

(65) Prior Publication Data
US 2021/0397520 A1 Dec. 23, 2021

(51) Int. Cl.
*G06F 11/14* (2006.01)
*G06F 21/62* (2013.01)
*G06F 16/2455* (2019.01)

(52) U.S. Cl.
CPC ...... *G06F 11/1458* (2013.01); *G06F 16/2455* (2019.01); *G06F 21/6227* (2013.01); *G06F 2201/80* (2013.01)

(58) Field of Classification Search
CPC ............. G06F 11/1458; G06F 16/2455; G06F 21/6227; G06F 2201/80
See application file for complete search history.

(56) References Cited

U.S. PATENT DOCUMENTS

| | | | |
|---|---|---|---|
| 8,429,708 B1* | 4/2013 | Tandon | G06F 21/604 713/153 |
| 2005/0028008 A1* | 2/2005 | Kumar | G06F 21/6227 726/2 |
| 2005/0050218 A1* | 3/2005 | Sheldon | H04N 21/2743 348/E7.071 |
| 2007/0255712 A1* | 11/2007 | Mahoney | G06F 16/182 707/999.009 |
| 2009/0030952 A1* | 1/2009 | Donahue | G06F 16/256 707/999.203 |
| 2009/0313626 A1* | 12/2009 | Dawson | G06Q 10/06 718/100 |
| 2018/0011461 A1* | 1/2018 | Camarasa | G08B 19/005 |

* cited by examiner

*Primary Examiner* — Alford W Kindred
*Assistant Examiner* — Tiffany Thuy Bui
(74) *Attorney, Agent, or Firm* — Staniford Tomita LLP

(57) ABSTRACT

A data protection application creates backups of assets. Each asset is mapped in a directory service to one or more asset owners. The directory service is separate from the data protection application. A search query from a user seeking to search the backups is received at the data protection application. The directory service is consulted to identify assets having the user as an asset owner. A search filter is generated including a list of the identified assets. The search filter is applied to the search query to exclude from a search result backups of assets not having the user as the asset owner. The search result is returned to the user, the search result thereby including backups of assets having the user as an asset owner and excluding other backups of other assets not having the user as the asset owner.

17 Claims, 9 Drawing Sheets

```
$user='CN=James Morton, CN=Users, DC=POC-domain, DC=local'
Set-ADUser -identity $user -Replace
@{info=" AssetOwner:10.25.250.22:Read' rAssetOwner:10.25.244.56:Admin "}
```

FIG. 3

```
Get-ADUser -identity $user -Properties info                    ← 405

DistinguishedName  : CN=James Morton, CN=Users, DC=poc-domain, DC=local
Enabled            : True
GivenName          : James          ╱─420A         ╱─430A      ╱─415A
info               : AssetOwner:10.25.250.22:Read
                     AssetOwner:10.25.244.56:Admin ╲─430B      ╲─415B
       410╱  420B╱
Name               : James Morton   ╲─425A         ╲─425B
ObjectClass        : user
ObjectGUID         : ceb82b37-9d31-4099-af71-aecca637d071
SamAccountName     : jamesmorton
SID                : S-1-5-21-2962934357-535340652-2908914553-1390
Surname            : Morton
UserPrincipalName  : jamesmorton@poc-domain.local
```

FIG. 4

```
{ "query": {    "bool":    {
       "must" : [
         {"query_string": {"query": "My keywords here" }},  ← 710
         {"terms": {"asset_name":
                    ["asset1", "asset3", "asset25", "asset42", "asset54" ] }}  ← 715
       ]  }  }  }
```

FIG. 7

CONTROLLING SEARCH ACCESS TO ASSETS IN A DATA PROTECTION PRODUCT

TECHNICAL FIELD

The present invention relates generally to information processing systems, and more particularly to conducting searches of backups created by a data protection system.

BACKGROUND

Many, if not all, organizations rely on backup or data protection systems to create backups of the devices used by users of the organization. Backups can be used to help recover from accidental deletions, data corruption, hardware failures, or other events that may cause a loss of data. For example, if a user accidentally deletes a file from their laptop or a file becomes corrupted, the file can presumably be recovered from a previous backup of the laptop.

There is a need, however, to secure the backups against unauthorized access. For example, when the user of the laptop is searching for a backup of the their laptop to restore, that user should not be able to access backups of other laptops or other devices that the user does not own or is not authorized to use.

Each backup system may include a configuration module that an administrator can use to identify which user has access to which backup. Typically, the responsibility for configuring such permissions is assigned to an administrator or information technology (IT) department of the organization. A large organization, however, may be conducting backups across many thousands of users and thousands or even tens of thousands of laptops, desktops, virtual machines, databases, mailboxes, and so forth. The administrator may not necessarily be familiar with the particular backup system used by the organization. These factors and others can make it very time-consuming to properly configure a backup system. There is a need for improved systems and techniques to facilitate securing access to backups in a backup or data protection application.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 shows an example of writing asset mappings into a directory service object, according to one or more embodiments.

FIG. 4 shows an example of properties for the directory service object, according to one or more embodiments.

FIG. 7 shows an example of a search having search terms including assets for filtering, according to one or more embodiments.

DETAILED DESCRIPTION

Figure 1:
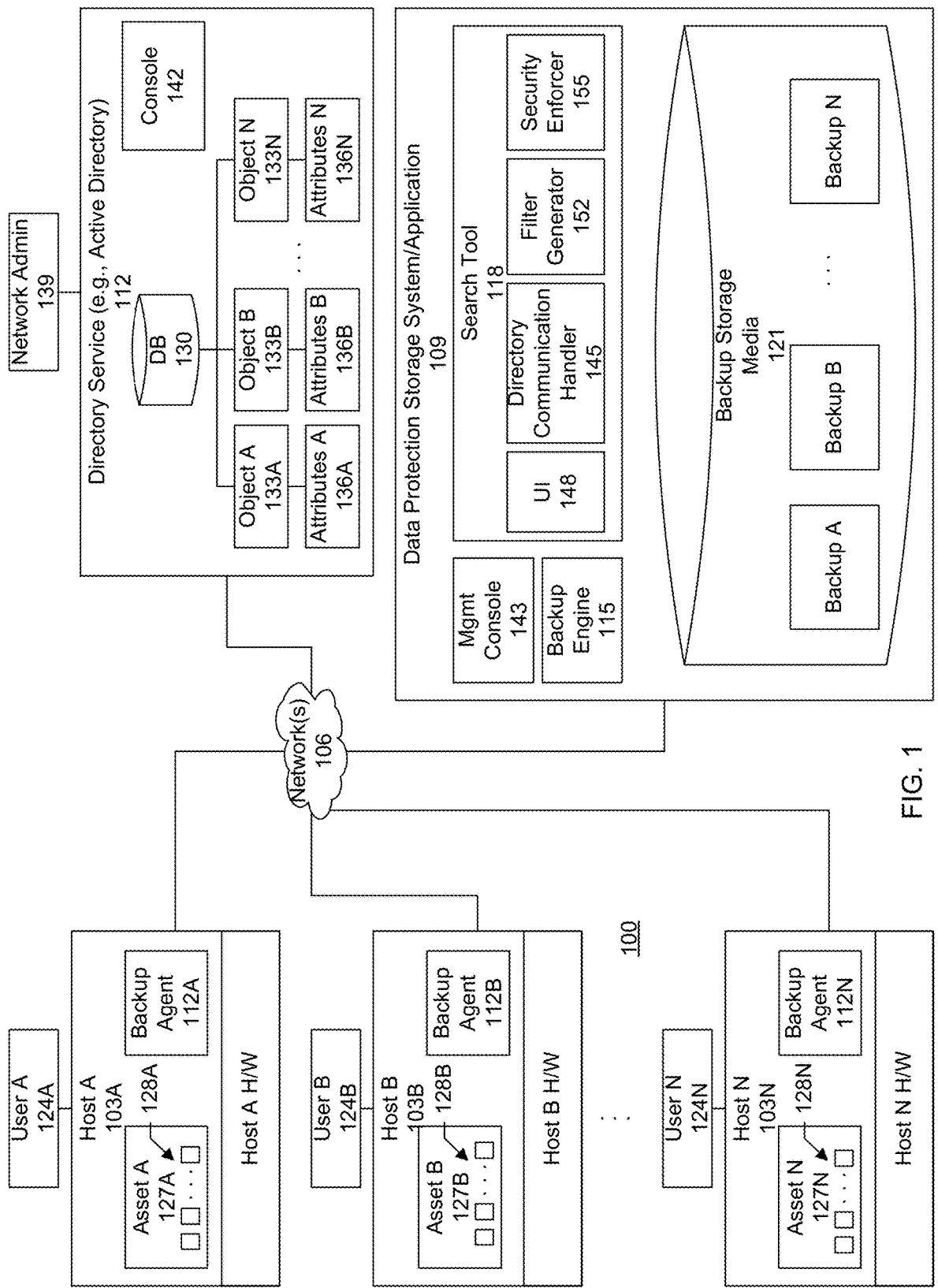
FIG. 1 shows a block diagram of an information processing system comprising a system for controlling search access in a data protection system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for controlling search access to assets in a data protection product. Modern data protection solutions typically include the ability to index backups at the item (file, email, etc.) level. The indexing may include, for example, cataloging each individual file of a file system or virtual machine that is backed up (e.g., recording metadata about the file such as a file name, creation date, last modified date, size, and so forth). The indexing may include, for example, cataloging each individual message within a mailbox (e.g., Exchange Mailbox) that is backed up. This allows customers to search for individual items (e.g., particular file) within the index, and then take an action on those items (such as restore). An example of a data protection product includes ProtectPoint as provided by Dell EMC of Hopkinton, Mass.

Typically there is a requirement to control access to the items—that is, only allow users with permissions to particular items to search and/or restore them. That permission can be at the item level (e.g., access control lists (ACLs)) or at the index level, but for most users the asset (host, VM, mailbox, etc.) level is the most practical. Where there are 1000s of assets, a flexible way to manage this is desirable. In other words, given that a data protection system may include 1000s or 10s of 1000s of assets, there are needs for systems and techniques that facilitate a customer manager's access to those assets and that allow management of the visibility of the assets from search activities.

In a specific embodiment, systems and techniques are provided that allow for defining the users and/or groups allowed to access items on those assets. In this specific embodiment, access may be at multiple levels, such as: 1) ability to search and display the metadata for items from those assets; 2) ability to search and display full text content for items from those assets; 3) ability to restore items from those assets to original and/or alternate locations; and 4) ability to conduct other actions such as export, legal hold, and so forth. In a specific embodiment, systems and techniques are provided to control search access per asset.

FIG. 1 shows a block diagram of an information processing system 100 configured in accordance with an illustrative embodiment. The variable N and other similar index variables herein such as M are assumed to be arbitrary positive integers greater than or equal to two. The information processing system may be provided within an organization, company, or other enterprise. The information processing system includes host computing devices 103A-N connected via a network 106 to a data protection storage system 109 which, in turn, is connected to a directory service 112, separate from the data protection storage system. The data protection storage system includes backup agents 112A-N installed at the host computing devices, backup engine 115, search tool 118, and backup storage media 121. It should be appreciated that the modules and components shown in FIG. 1 may be functional and there can be many different hardware and software configurations to implement the functions described.

The host computing devices may be operated by users 124A-N. A user may be referred to as an end user. Examples of host computing devices include laptops, desktops, servers, smartphones, portable communication devices, tablet computing devices, or other types of processing devices capable of communicating with the data protection storage system, active directory service, or both.

Each host may include one or more assets (e.g., assets 127A-N), where each asset may include multiple items (e.g., items 128A-N) such as files, emails, or other individual units of data. The backup agents coordinate with the backup engine to backup or copy the assets (and all items within an asset) to the data protection storage system. The backups of the assets may be indexed by the data protection storage system and stored in backup storage media.

Some examples of assets include virtual machines (VMs), filesystems or filesystem host (e.g., laptop or desktop), databases, containers (e.g., a container within a Docker Swarm, Kubernetes, or virtualized computing environment), mailboxes (e.g., an individual Microsoft Exchange mailbox). An asset may include, have, store, or generate many items of data in which it is desirable to create backup copies as a precaution against accidental deletion, corruption, or other data loss event.

For example, backing up a virtual machine asset may include backing up a virtual hard disk of the virtual machine to the data protection storage system. Backing up a filesystem asset may include backing up all the files within the filesystem to the data protection storage system. Backing up a database asset may include backing up all the records in the database to the data protection storage system. Backing up a mailbox may include backing up all the email messages in the mailbox to the data protection storage system.

The search tool allows users to perform a self-service search of the backups created and managed by the data protection storage system. For example, if the user accidentally deleted a file from their laptop, the user can use the search tool to search for a backup of their laptop to restore the file from the backup. The user does not have to contact a backup administrator to perform the search.

The directory service, also referred to as a name service, maps the names of network resources to their respective network addresses. The directory service provides a shared information infrastructure for locating, managing, administering, and organizing everyday items and network resources, which can include volumes, folders, files, printers, users, groups, devices, telephone numbers and other objects. A directory service is an important component of a network operating system. A directory server or name server is a server which provides such a service. Each resource on the network is considered an object by the directory server. Information about a particular resource is stored as a collection of attributes associated with that resource or object.

More particularly, a directory service defines a namespace for the network. The namespace is used to assign a name (unique identifier) to each of the objects. Directories typically have a set of rules determining how network resources are named and identified, which usually includes a requirement that the identifiers be unique and unambiguous. When using a directory service, a user does not have to remember the physical address of a network resource as providing a name locates the resource. Some directory services include access control provisions. These access control provisions can limit the availability of directory information to authorized users.

In a specific embodiment, the directory service uses the Lightweight Directory Access Protocol (LDAP) for accessing and maintaining distributed directory information services over an Internet Protocol (IP) network. An example of a directory service is active directory (AD) as provided by Microsoft Corporation of Redmond, Wash. for Windows domain networks. Specific embodiments are described in conjunction with active directory. It should be appreciated, however, that the described systems and techniques can be applied to other directory services including other LDAP-based directory services.

The directory service includes a directory database 130 in which objects 133A-N tracked by the directory are stored. In a specific embodiment, the objects include user objects and groups. A group is a collection of other directory objects. Groups can be used to collect user accounts, computer accounts, and other groups into manageable units. Working with groups instead of with individual users helps simplify network maintenance and administration.

In this specific embodiment, the objects are stored in a hierarchical data structure or tree. Other examples of objects that may be tracked by the directory service include printers and network devices. Each object includes a set of attributes (e.g., attributes 136A-N) storing descriptive information about a respective object. The user objects correspond to or represent the users (e.g., users A-N) of the organization. Group objects represent groups that a user may be a member of.

When, for example, a user attempts to log into a computer that is part of a domain managed by the directory service, a domain controller of the directory service can check the login credentials of the user to determine whether the user should be allowed to log into the network and, if so, the security policies that should attach to the user as defined in the attributes associated with a user object representing the user. For example, some users may be allowed to install or update software. Other users may be blocked from installing or updating software.

The directory service is typically managed by a network administrator user 139. A console 142 of the directory service provides a user interface through which the network administrator can create and manage domains, users, and objects within a network. For example, when a new employee joins an organization, the network administrator may create in the directory a new user object representing the new employee. User rights and permissions may be attached as attributes to the new user object in order to limit or control the new employee's access to the network and other computers or devices connected to the network. Specifically, the network administrator may create a user account within the directory service that allows the new employee to log in to the organization's network and sign in to a computer (e.g., laptop or desktop) given or assigned to the new employee by the organization.

When an employee leaves the organization, the network administrator may delete, remove, or otherwise update a user object from the directory representing the employee so that the now former employee will not be able to log in to the network. When an employee moves to a different department within the organization, the network administrator may update in the directory attributes associated with a user object representing the employee to reflect a new set of rights or permissions that the employee may now have. The user interface can be a graphical user interface (GUI) or a programmatic user interface. For example, the network administrator may run executable scripts that help automate the updating of the directory service.

As discussed, the data protection system can protect/backup a wide variety of asset types. The data protection system may include a management console 143 through which the organization may define, among other things, access rights or access levels that the various users of the organization may have on the asset backups. For example, the organization may allow a particular user of the organization to have access to backups created for a laptop owned by the particular user; but block access to backups created for other laptops not owned by the particular user.

In some cases, it is desirable to manage permissions at the asset-level. Typically, the most prevalent will be entities that are "owned" by a single user or group of users. Examples may include a virtual machine (VM); a filesystem host (e.g., laptop or desktop); a container within Docker Swarm, Kubernetes, etc.; or an individual mailbox. Such entities may include access control lists (ACLs), but restricting access at that level can be overkill or excessive because of the administrative overhead associated with managing permissions at such a granular level.

For example, in some cases even though the files on a particular user's laptop may have a variety of permissions, many local to that machine, that particular user should reasonably expect to be able to search and restore any file on that particular laptop (or other asset, e.g., VM) that the particular user owns. In other words, consider there is a user that "owns" a laptop, desktop, or virtual machine asset. The asset (e.g., desktop) may contain millions of files with differing permissions. It may be desirable, however, to grant the user ultimate authority over any of those files—e.g., allow the user to search any backup of their desktop and restore any file from the backup of their desktop. An exception to this rule may include file servers, which are generally shared by many users, and may be better restricted by ACLs or at the home directory level.

It can require a significant amount of time and training to acquire the skillset necessary to properly configure the directory service product and understand its particular schema. A schema is like a blueprint that describes the rules about the type of objects that can be stored in the directory service as well as the attributes associated with these objects. The schema thus defines the content, and the structure of the object classes and the object attributes used to create an object. While creating a new object, the directory service references the classes defined in the schema and utilizes the retrieved information to create the object. The organization may have invested resources to train various employees in the organization so that these employees can fulfill the role of a network administrator.

In a specific embodiment, the directory service and data protection system are separate or different products. For example, the directory service and data protection system may be provided by different vendors, have different interfaces, use different terminology, execute independently of each other, have different schemas, have different libraries, and so forth. These differences may require an administrator to learn and interface with the data protection system in order to properly secure the backups of assets from unauthorized access.

It is desirable to leverage knowledge of the directory service into other areas in order to reduce that amount of retraining and duplicative work that the organization may have to perform. In a specific embodiment, systems and techniques are provided to allow mappings between assets and LDAP-based users/groups. In this specific embodiment, the LDAP objects themselves are leveraged to provide those mappings. This allows administrators to use native tools and scripting to maintain the mappings. This does not preclude the data protection software from also providing the ability to assign ownership via a user interface. Assets may be identified by name, internet protocol (IP) address, or other identifier (ID). Systems and techniques are provided that include the ability to define roles in those mappings.

Different levels of access to a backup may allow a user to search and view metadata of items in the backup, but not view full text content of the items. Another level of access, however, may allow viewing of full text content. Another level of access may allow restoring items in the backup or other actions such as exporting items in the backup. In a specific embodiment, an access level of "Read" allows search/display of metadata but no restore. An access level of "Admin" allows search/display of metadata and restore. An access level of "ReadFull" allows search/display of full content but no restore. An access level of "AdminFull" allows search/display of full content and restore.

In other words, in a specific embodiment, the network administrator uses the directory service to add metadata about the assets and, more particularly, to identify, associate, or map assets—that are to be backed up by the data protection system—with objects managed by the directory service. These objects may include user objects, group objects, or both. The network administrator can further define, within the directory service, levels of access a user or group of users (as represented by a user object or group object, respectively) should have for a backup of a particular asset.

Generally, the network administrator will already be familiar with the directory service. Thus, the asset mappings can be accomplished with relatively little training because the asset mappings are performed and stored within the directory service itself. The network administrator will not have to learn a new interface of a third party product. Mapping assets can be performed contemporaneously with updates to the directory service as may be performed in connection with, for example, the onboarding of a new employee or a change in status of an existing employee. These events can occur frequently because people join, leave, and move around in organizations on an on-going basis. When such events occur, the network administrator will not have to also access a separate third party application (e.g., data protection system) in order to associate assets to the new employee or update asset assignments of an existing employee whose status has changed. For example, the removal of a user object from the directory service for an employee that has left the organization will automatically result in the now former employee from being unable to access backups managed by the data protection system.

More particularly, when a user wishes to search for a backup created by the data protection system for an asset (e.g., laptop, desktop, mailbox, or other asset type), the user uses the search tool of the data protection system to enter a search query. The search tool includes a communication handler 145, user interface 148, filter generator 152, and security enforcer 155. The communication handler is responsible for consulting with the directory service to identify assets owned or associated with the user, along with the levels of access to the backups of those assets as stored and specified in the directory service. The data protection system receives from the directory service the identification of the assets and levels of access allowed.

The filter generator is responsible for generating a search filter having a list of the identified assets. The search filter is applied to the search query to exclude from a search result backups of assets not owned or associated with the user. The search result may then be displayed in the user interface, the search result thereby excluding or omitting the backups of assets not owned or associated with the user and including backups of assets owned or associated with the user.

The security enforcer is responsible for enforcing the various levels of access to the backups as defined in the directory service. For example, if a level of access for a particular asset is specified as "read," the user may be allowed to view metadata associated with the backup of the particular asset, view item content in the backup, or both; but may be blocked from restoring the backup. If the level of access is specified as "admin," the user may be allowed to restore the backup. As discussed, in a specific embodiment, security is enforced at the asset-level as defined within the directory service. For example, a user object may be mapped to an asset and a first level of access may be specified in an attribute associated with the user object. The asset may include a set of items (e.g., files or email messages) and the first level of access is applied to all items within the asset.

An administrator of the organization does not have to access the data protection system in order to define the access levels or security policies that should be attached to the asset backups. Instead, the administrator can define the security within the directory service and thus via an interface that the administrator may already be familiar with.

If, however, an organization wishes for a more granular level of access, such as at an item level, an administrator can access the data protection system to further specify the level of access. For example, the administrator may, via the data protection system, specify that for a particular user certain items in a backup of an asset are "read," while other items in the backup are "admin." The particular user is thus able to read or view some items in the backup of the asset, but not able to restore them; whereas for other items in the backup of the same asset the user will be able to restore them. Thus, the system provides a high-level of flexibility and control. Organizations that do not have a need for controlling access at the item-level can simply work within the directory service to specify access at the asset-level. Other organizations that have such a need can use the data protection application to further define the access levels at a more granular level.

Figure 2:
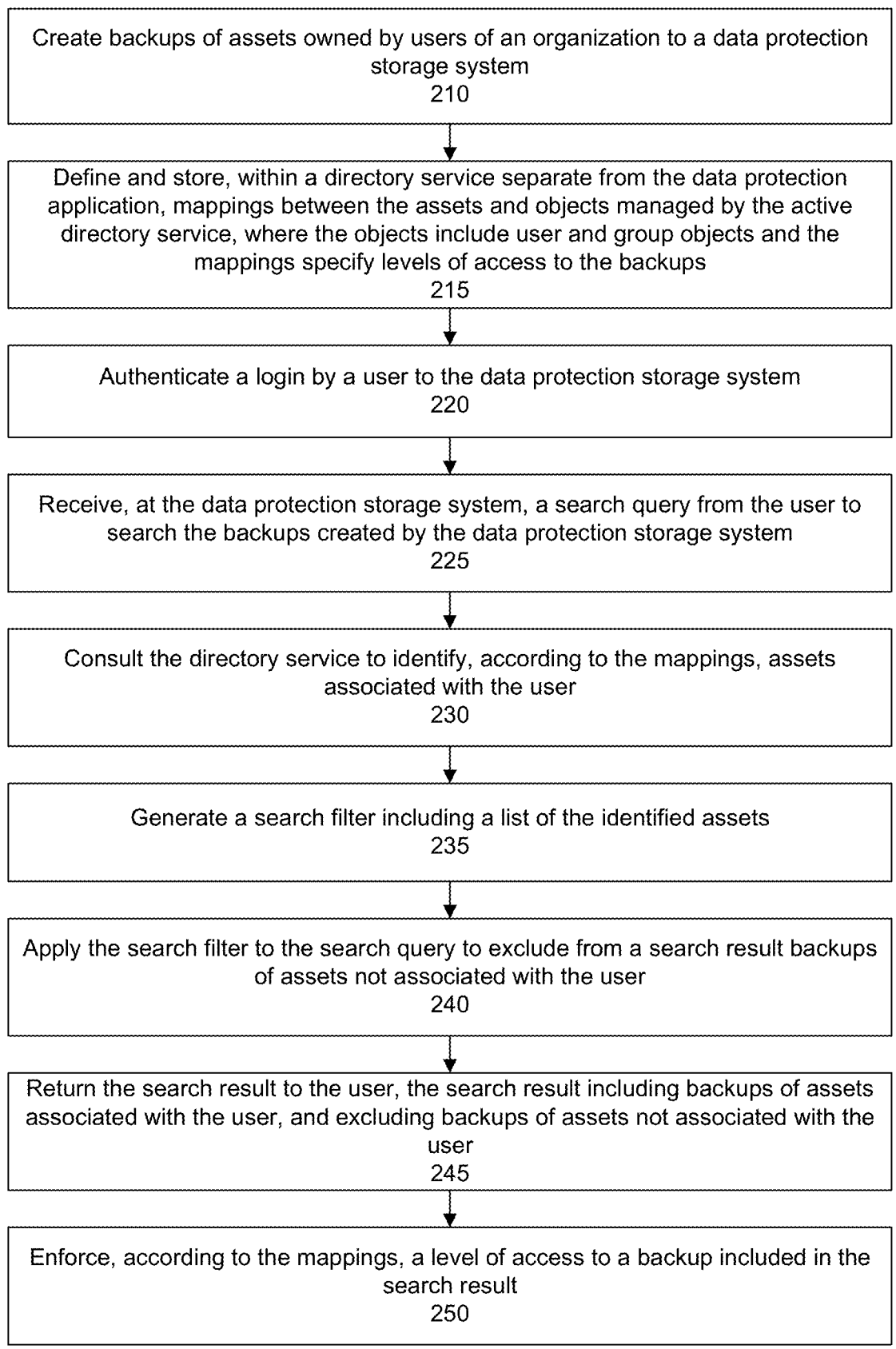
FIG. 2 shows an overall flow of a process for controlling search access in a data protection system, according to one or more embodiments.

FIG. 2 shows an overall flow of operations for controlling search access to assets in a data protection product. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210, a data protection storage system creates backups of assets owned or associated with users of an organization. In a step 215, there is a directory service, separate from the data protection storage system. Mappings between the assets and objects managed by the directory service are created, defined, and stored in the directory service. The mappings identify assets to be associated with a particular directory service object and specify levels of access that the directory service object should have on backups of the assets. The directory service objects may include user objects, groups of user objects (i.e., group objects), or both.

Assets may be mapped to multiple (e.g., two or more) objects. For example, there can be a first asset mapped to a first user object having an attribute specifying a first level of access to backups of the first asset. The first asset may be mapped to a second user object having an attribute specifying a second level of access to the backups of the first asset, different from the first level of access. The first asset may be mapped to a group object having a collection of other user objects and having an attribute specifying, for example, the first level of access. In this case, each of the user objects that are members in the group object will have the first level of access to the backups of the first asset.

In a step 220, a login by a user to the data protection storage system is authenticated. For example, the user may access the data protection storage system and input login credentials (e.g., username and password). The data protection storage system may consult the directory service to determine whether the credentials are valid. If so, the user is allowed to continue their login to the data protection storage system. If not, the user may be blocked from further accessing the data protection storage system. In a step 225, upon a successful authentication, the data protection storage system receives from the user a search query to search backups created and managed by the data protection storage system.

In a step 230, the data protection storage system consults the directory service to identify, according to the mappings, assets associated with the user. An asset may be associated with the user as a result of a user object representing the user having been mapped to the asset. An asset may be associated with the user as a result of a group object having been mapped to the asset, where the user is a member of a group represented by the group object. In a specific embodiment, the data protection storage system retrieves, from the directory service, a listing of assets whose backups the user is allowed at least some level of access. In a step 235, the data protection storage system generates a search filter including a list of the identified assets.

In a step 240, the search filter is applied to the search query to exclude from a search result backups of assets not associated with the user. In a step 245, the data protection storage system returns or displays the search result to the user, the search result including backups of assets associated with the user, and excluding backups of assets not associated with the user.

It should be appreciated that the user may input search criteria with the search query to filter out backups that the user is not interested in. For example, the user may be interested in backups created during a specific time period, e.g., backups created between Oct. 7, 2019 and Feb. 3, 2020. The user-inputted search criteria is different from the search filter generated by the data protection storage system to exclude from the search result backups of assets not associated with the user.

In a step 250, the data protection storage system enforces, according to the mappings, a level of access to a backup included in the search result. For example, the data protection storage system may prevent or block an attempt to restore a backup of an asset if the user's level of access is "read." In this case, the data protection application of the storage system may disable or not display an option, control, or other graphical widget for restoring a backup. Alternatively, the data protection storage system may allow the attempt to restore the backup if the user's level of access is "admin." In this case, the data protection application may enable or display the option, control, or other graphical widget for restoring the backup.

As discussed, in a specific embodiment, the directory service is Active Directory. Active Directory is widely used to manage users and groups in the enterprise. The AD schema can be customized, but existing fields can also be leveraged to store custom information. FIG. 3 shows an example of writing asset mappings to the "info" field of a user (or user object) in the command-line shell known as Powershell and provided by Microsoft (step 215, FIG. 2). FIG. 4 shows an example of reading those mappings back in Powershell.

In the example of FIG. 4, a set of properties 405 are shown for a directory service user object corresponding to a user named "James Morton." As one of skill in the art will recognize, these properties show Active Directory fields such as DistinguishedName, GivenName, ObjectClass, ObjectGUID, and so forth.

The properties further include an "info" field 410. In a specific embodiment, the "info" field is used to store an identification of assets associated with or owned by the user and a specification of a level of access that the user may have to backups of those assets. The "info" (or other user object field) may include any number of entries identifying any number of assets to map to the user, along with corresponding levels of access to backups of the assets. Thus, in a specific embodiment, existing metadata fields in objects managed by the directory service are leveraged to add additional information to indicate asset owner, asset identifier (e.g., IP address or other identifier), and the level of access to backups of the asset.

In the example shown in FIG. 4, the "info" field includes a first entry 415A and a second entry 415B. The first entry includes an asset owner flag 420A containing an identification of an asset 425A, (e.g., IP address "10.25.250.22"), and an identification of a level of access 430A allowed on backups of the respective asset (e.g., "read").

The second entry likewise includes an asset owner flag 420B containing an identification of an asset 425B, (e.g., IP address "10.25.244:56"), and an identification of a level of access 430B allowed on backups of the respective asset (e.g., "admin"). It should be appreciated that the use of IP addresses to identify assets is merely an example. An asset may instead be identified by name or other identifier. For example, some assets backed up by the data protection system may not necessarily be identified via an IP address and may instead be identified via another identifier within a namespace specified by the data protection system through which assets are identified for backup. An asset may be identified via a string, a name of a virtual machine host, a name of a database, a name of a mailbox, or host name of a laptop or desktop—just to name a few examples.

As discussed, in a specific embodiment, an existing object field (e.g., "info" field) is used for the asset mappings. Some directory services, however, allow for adding custom fields or otherwise extending the schema so that an organization can tailor the directory service to their own particular needs. Thus, asset mappings may instead be added to other custom fields within the directory service.

Figure 5:
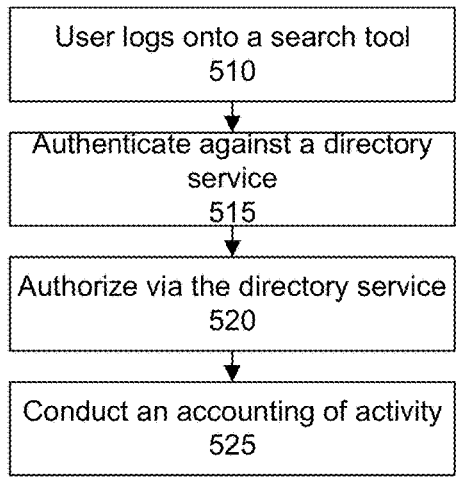
FIG. 5 shows another flow of a process for controlling search access in a data protection system, according to one or more embodiments.

FIG. 5 shows an overall flow for leveraging LDAP-based permissions for a search tool of a data protection system according to one or more embodiments. In a step 510, a user logs onto a search tool such as a search tool provided by a data protection or backup application. In a step 515, the user is authenticated against a directory service. In a step 520, the user is authorized via the directory service. In a step 525, an accounting is conducted (e.g., auditing, logging) of their activity.

Figure 6:
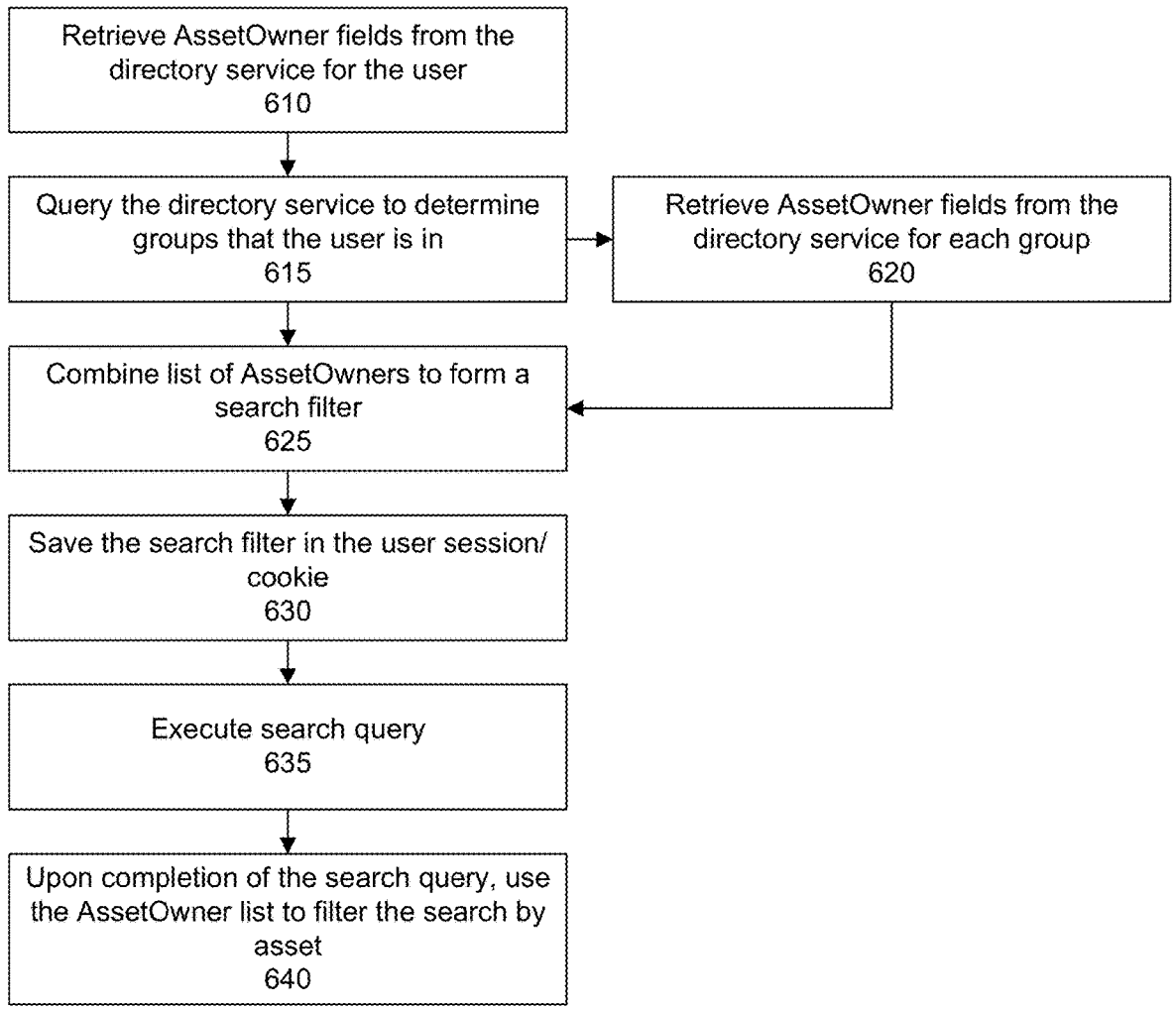
FIG. 6 shows further detail of an authorization flow, according to one or more embodiments.

FIG. 6 shows further detail of a flow for the authorization step according to one or more embodiments. Consider, as an example, that the directory service is Active Directory and fields, e.g., AssetOwner, have been added to or inserted into objects within Active Directory to create mappings between assets and objects. Specifically, an AssetOwner field of an object may include first and second values. The first value may include an identification of an asset to associate with the object. The second value may include an identification of a level of access a user or group represented by the object should have on backups of the asset.

In a step 610, the data protection storage system communicates with the directory service (e.g., active directory) to retrieve AssetOwner fields from the directory service for the user. For example, the data protection storage system may issue a request to the directory service for a listing of assets (and corresponding access levels) that have been mapped to the user.

In a step 615, the data protection storage system queries the directory service to determine groups that the user is in. For example, the data protection system may issue a request to the directory service for a listing of groups in which the user is a member of.

In a step 620, for each identified group in which the user is a member of, the data protection storage system communicates with the directory service to retrieve AssetOwner fields from the directory service for each group. The directory service may then return another listing of assets (and corresponding access levels) that have been mapped to the group in which the user is a member of. Step 620 is repeated for each identified group in order to identify all the assets that the user may be associated with. Step 620, however, may be optional as in some cases a user might not be a member of any group.

In a step 625, the lists of AssetOwner are combined to form a search filter that is saved in the user session/cookie. For example, there can be a first list identifying assets that have been mapped to the user. There can be one or more second lists identifying assets that have been mapped to groups having the user as a member. As part of the combining operation, duplicate assets may be removed. For example, an asset may be listed in a user object representing a user. The same asset may be listed in a group object containing the user object. When the asset lists are combined to combined to form the search filter, a duplicate asset may be removed.

In a step 635, the search query is executed. In a step 640, upon completion of the search query, the combined AssetOwner list is used to filter the search by asset. In other words, a backup of an asset, though satisfying the user's search query, may be excluded from a search result presented to the user if the asset is not listed in the AssetOwner list. As an example, consider that a user included the keyword search term "Potwin.doc" in their search query and the term happened to be located in a backup of a laptop not owned or associated with the user. That is, the laptop is not listed in any of the AssetOwner fields of a user object representing the user or group objects of groups the user is a member of. The backup will then be omitted from a search result displayed to the user.

In a specific embodiment, a method may include receiving, at a data protection application, a search query from a user seeking to search backups of assets managed by the data protection application; reading a user object representing the user to obtain a first listing of assets, stored with the user object; reading each of one or more group objects containing the user object and representing one or more groups that the user is a member of to obtain a second listing of assets, stored with a respective group object; combining the first and second listings of assets; removing any duplicate assets in the combined listings of assets to form a search filter; and applying the search filter to the search query.

FIG. 7 shows an example of filtering a search by asset. The example shown in FIG. 7 is of an Elasticsearch® as provided in Dell EMC ECS—an object store platform from Dell EMC. Elasticsearch® is a distributed, RESTful search and analytics engine. As shown in the example of FIG. 7, the search includes query terms 710 input by the user that "must" be present and also a listing of assets 715 associated with the user (e.g., asset1, asset3, asset25, asset 42, and asset 54). Thus, a backup of an asset may satisfy the user's query terms, but if the asset does not appear in the listing of assets the backup for the asset will be excluded from a search result displayed to the user. Conversely, in cases where a backup of an asset satisfies the query terms and the asset does appear in the listing of assets, the backup will be included in the search result displayed to the user.

Figure 8:
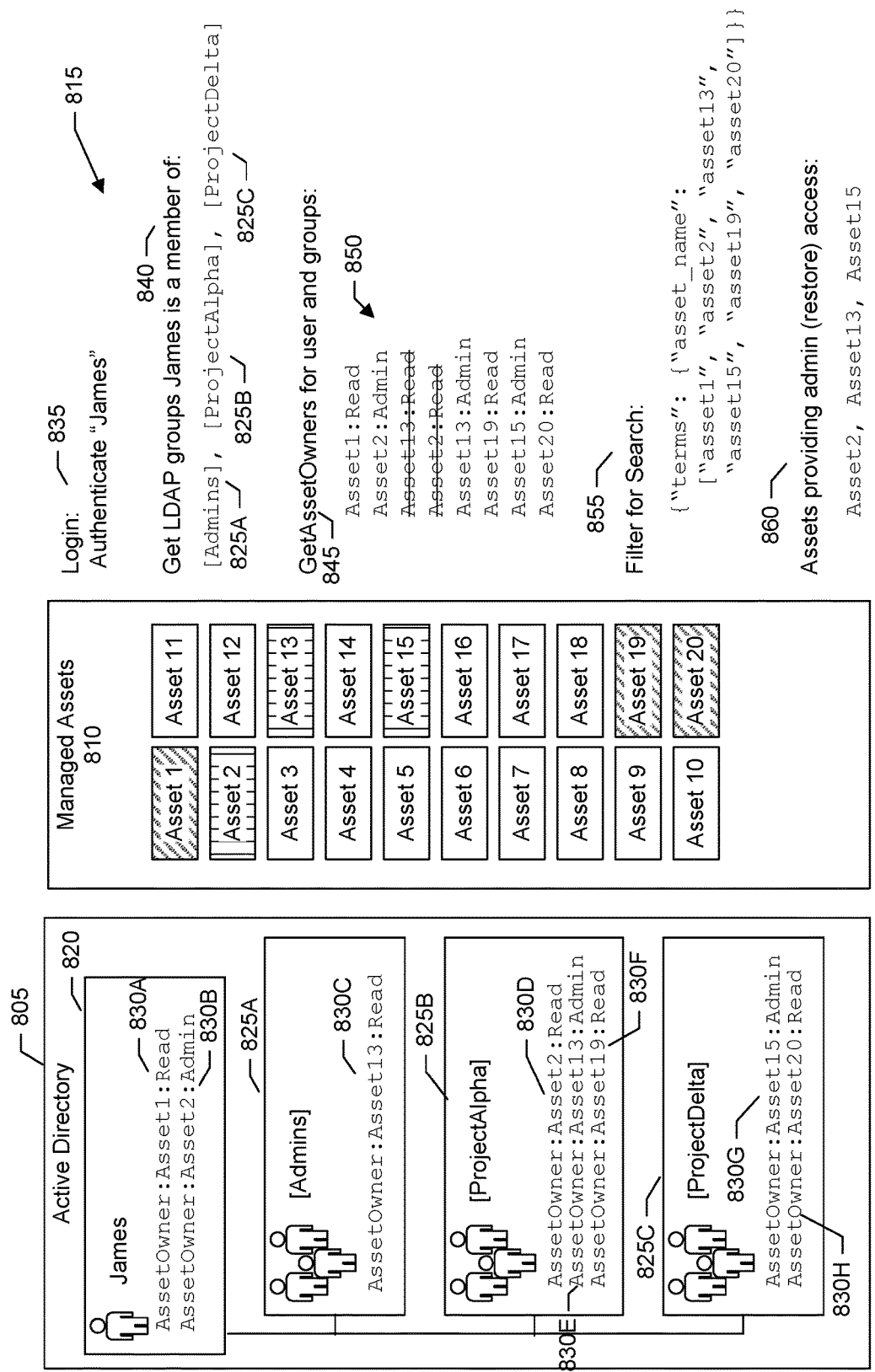
FIG. 8 shows a block diagram of an example for controlling search access to assets in a data protection system, according to one or more embodiments.

FIG. 8 shows a block diagram illustrating operations for controlling search access to assets in a data protection product according to one or more embodiments. There is a directory service (e.g. Active Directory) 805, managed assets 810, and flow 815.

The directory service supports and manages various components of an organization's network as objects. The example in FIG. 8 shows a user object 820, representing a user named "James," and first, second, and third group objects 825A-C representing groups in which the user is a member. The objects have been mapped to assets by adding to each object one or more AssetOwner fields, where each AssetOwner field includes an identification of an asset and specifies a level of access allowed on backups of the asset.

For example, the user object includes an AssetOwner field 830A and an AssetOwner field 830B. AssetOwner field 830A includes a value identifying Asset1 as being associated with the user object, and another value specifying a "Read" level of access to backups of Asset1. AssetOwner field 830B includes a value identifying Asset2 as being associated with the user object, and another value specifying an Admin level of access to backups of Asset2.

Group object 825A includes an AssetOwner field 830C. AssetOwner field 830C includes a value identifying Asset13 as being associated with group object 825A, and another value specifying a "Read" level of access to backups of Asset13.

Group object 825B includes AssetOwner fields 830D-F. AssetOwner field 830D includes a value identifying Asset2 as being associated with group object 825B, and another value specifying a "Read" level of access to backups of Asset2. AssetOwner field 830E includes a value identifying Asset13 as being associated with group object 825B, and another value specifying an "Admin" level of access to backups of Asset13. AssetOwner field 830F includes a value identifying Asset19 as being associated with group object 825B, and another value specifying a "Read" level of access to backups of Asset19.

Group object 825C includes AssetOwner fields 830G-H. AssetOwner field 830G includes a value identifying Asset15 as being associated with group object 825C, and another value specifying an "Admin" level of access to backups of Asset15. AssetOwner field 830H includes a value identifying Asset20 as being associated with group object 825C, and another value specifying a "Read" level of access to backups of Asset20.

The managed assets lists all the assets backed up by the data protection system, e.g., assets 1-20. Assets 1, 2, 13, 15, 19, and 20 are shown with a fill pattern to indicate that these assets have been mapped or associated, within the directory service, to user "James." Assets 1, 19, and 20 are shown with a fill pattern of diagonal lines to indicate "Read" access to backups of these assets. Assets 2, 13, and 15 are shown with a fill pattern of vertical lines to indicate "Admin" access to backups of these assets.

In a step 835, the user logs in and is authenticated. In a step 840, the data protection system communicates with the directory service to get groups (e.g., LDAP groups) that the user is a member of, e.g., groups 825A-C.

In a step 845, the AssetOwner fields are retrieved for the user and groups that the user is a member of. A listing 850 of assets is generated that includes an identification of all assets associated with the user and a level of access that should be granted to the user on backups of the assets. In the example shown in FIG. 8, Asset13 having a "Read" level of access and Asset2 having a "Read" level of access are shown with a strike through to indicate that there was a conflict with the levels of access and another level of access has taken precedence (e.g., "Admin"). Specifically, Asset13 was mapped to group object 825A and assigned the "Read" level of access. Asset13 was also mapped to group object 825B and assigned the "Admin" level of access.

Similarly, Asset2 was mapped to user object 820 and assigned the "Admin" level of access. Asset2 was also mapped to group object 825B and assigned the "Read" level of access. In a specific embodiment, in cases of conflict, the access offering the higher level of access takes precedent (e.g., "Admin"). The system may be configured, however, to instead default to the access offering the lower level of access (e.g., "Read").

In a step 855, a filter for the search is generated. The filter includes the listing of associated assets as search terms so that backups of other assets not associated with the user will be excluded from the search result.

In a step 860, the data protection system enforces the level of access to the backups as specified in the directory service. In this example, assets having the "Admin" or "restore" access include Asset2, Asset13, and Asset15.

In a specific embodiment, roles can be used separately to determine what assets are applicable for actions including, for example, full content, view metadata only, restore, and so forth. Further, the use of the directory service to define access levels does not preclude the data protection system from also providing the ability to assign ownership via a user interface.

In a specific embodiment, the data protection system may include a synchronization module that synchronizes asset ownership assignments made in the data protection system with the directory service. For example, an administrator may use the data protection system to assign ownership of an asset to a user and specify a level of access the user should have on backups of the assets. Upon the administrator confirming the assignment, the data protection system may automatically execute a script or other commands to programmatically interface with the directory service and update a user object in the directory service representing the user. In other words, attributes may be added to the user object which identify the asset and the level of access.

In another specific embodiment, the data protection system may be used to assign levels of access at a finer or more granular level as compared to assigning from within the directory service. For example, if the administrator wishes to define finer levels of access, the administrator can access a user interface from within the data protection application to do so. Such finer levels of access may include, for example, limiting a restore of a backup of an asset to particular computing devices, limiting a number of restores that may be performed, limiting a restore to specific items (e.g., files) within a backup, and so forth.

Below is a discussion of advantages of leveraging the directory service or LDAP properties to control access to search in a data protection product. Ownership of assets change frequently. In particular, new assets are on-boarded for a new user, users lose ownership when they leave the company or replace devices, additional ownership may be assigned to a manager, IT resource, auditor, etc. These events are typically handled by the LDAP/network administrator. It is desirable that resources are not needed to additionally make such changes in software products. Instead, in a specific embodiment, the changes can be driven in the directory service (e.g., AD/LDAP) with small modifications to existing scripts/workflows.

In various specific embodiments, systems and techniques are provided to define the roles with different level access control for search result per asset; map defined roles with access control of search result per asset; restrict search results to those a search user has read permissions to; restrict search actions (such as restore) to those a search user has admin permissions to; store access permissions in the directory service itself; and allow the IT admin to self-service the role/assets mappings with native tools.

In a specific embodiment, there is a method comprising: creating, by a data protection application, a plurality of backups corresponding to a plurality of assets, wherein each asset is mapped in a directory service, separate from the data protection application, to one or more objects managed by the directory service, the one or more objects comprising at least one of a user object or a group object; receiving, at the data protection application from a user, a search query comprising one or more search terms input by the user; retrieving from the directory service a first list comprising an identification of assets that have been mapped to a user object representing the user; querying the directory service to identify group objects having the user as a member; retrieving from the directory service for each identified group a second list comprising an identification of assets that have been mapped to a group object having the user as a member; modifying the search query by adding to the search query all assets identified in the first list as first additional search terms; modifying the search query by adding to the search query all assets identified in the second list as second additional search terms; and executing the modified search query, the modified search query thereby including the one or more search terms input by the user, the first additional search terms, and the second additional search terms.

In a specific embodiment, there is a method comprising: creating, by a data protection application, a plurality of backups corresponding to a plurality of assets, wherein each asset comprises one or more asset owners, the asset owners and levels of access allowed on the backups being defined in an active directory service, different from the data protection application; receiving, at the data protection application, a search query from a user seeking to search the backups created by the data protection application; consulting the active directory service to identify assets having the user as an asset owner and a level of access allowed on backups of the identified assets; generating a search filter comprising a list of the identified assets; applying the search filter to the search query to exclude from a search result backups of assets not having the user as the asset owner; returning the search result to the user, the search result comprising backups of assets having the user as the asset owner and excluding other backups of other assets not having the user as the asset owner; and enforcing, by the data protection application, a level of access allowed on a backup included in the search result, the level of access having been defined in the active directory service.

In another specific embodiment, there is a method comprising: creating, by a data protection application, a plurality of backups corresponding to a plurality of assets of an organization; instructing an administrator of the organization to modify objects of a directory service of the organization by inserting into the objects one or more asset owner fields, each asset owner field comprising a first value identifying an asset to be mapped to a respective object, and a second value identifying a level of access that the respective object should have on backups of the asset, the objects comprising one or more of user objects or group objects; receiving, at the data protection application, a search query from a user seeking to search the backups created by the data protection application; retrieving, from the directory service, first asset owner fields from a user object representing the user; extracting, from the first asset owner fields, identifications of first assets that have been mapped to the user object and levels of access to backups of the first assets; retrieving, from the directory service, second asset owner fields from each group object containing the user object; extracting, from the second asset owner fields, identifications of second assets that have been mapped to group objects containing the user object and levels of access to backups of the second assets; generating terms for a search filter, the terms comprising the identifications of first assets and the identifications of second assets; adding the terms to the search query; executing the search query having the added terms, a result of the search query thereby excluding backups of assets not in the identified first assets or the identified second assets; and enforcing a level of access for each backup of an asset included in the result according to the extracted levels of access.

In a specific embodiment, there is a method comprising: creating, by a data protection application, a plurality of backups corresponding to a plurality of assets, wherein each asset is mapped in a directory service, separate from the data protection application, to one or more objects managed by the directory service, the one or more objects comprising at least one of a user object or a group object; receiving, at the data protection application, a search query from a user seeking to search the backups created by the data protection application; retrieving from the directory service a first list comprising an identification of assets that have been mapped to a user object representing the user; querying the directory service to identify group objects representing groups having the user as a member; retrieving from the directory service for each identified group a second list comprising an identification of assets that have been mapped to a group object having the user as a member; creating a search filter by combining the first and second lists; and applying the search filter to the search query to exclude from a search result backups of assets not mapped to the user object representing the user and backups of assets not mapped to group objects representing groups having the user as a member.

The method may further include: retrieving, from the directory service, a level of access that the user should have to backups of the assets listed in the first and second lists; and enforcing, by the data protection application, the level of access. Each asset may include a plurality of items to be backed up and indexed by the data protection application.

In a specific embodiment, each of the one or more objects comprises a field having a first value and a second value, wherein the first value identifies an asset to be mapped to a respective object, and the second value identifies a level of access the respective object should have on backups of the asset.

The assets may include at least one of a file system, virtual machine, container, database, table within a database, or mailbox. The one or more objects may be stored by the directory service and the backups may be stored by the data protection application.

In a specific embodiment, there is a method comprising: creating, by a data protection application, a plurality of backups corresponding to a plurality of assets, wherein each asset is mapped in a directory service to one or more asset owners, and the directory service is separate from the data protection application; receiving, at the data protection application, a search query from a user seeking to search the backups; consulting the directory service to identify assets having the user as an asset owner; generating a search filter comprising a list of the identified assets; applying the search filter to the search query to exclude from a search result backups of assets not having the user as the asset owner; and returning the search result to the user, the search result thereby comprising backups of assets having the user as an asset owner and excluding other backups of other assets not having the user as the asset owner.

In an embodiment, each asset is mapped to one or more objects managed by the directory service, the one or more objects comprise at least one of a user object or a group object, and the consulting the directory service comprises: retrieving from the directory service a first list comprising first identifications of assets that have been mapped to a user object representing the user; querying the directory service to identify group objects representing groups having the user as a member; retrieving from the directory service for each identified group second identifications of assets that have been mapped to a group object representing a group having the user as a member; and combining the first and second identifications of assets to form the list of identified assets for the search filter.

The method may further include retrieving, from the directory service, a level of access that the user should have to backups of assets in the list of identified assets, the level of access thereby having been specified in the directory service; and enforcing, by the data protection application, the level of access.

In an embodiment, each asset is mapped to one or more objects managed by the directory service, the one or more objects comprise at least one of a user object or a group object, wherein each of the one or more objects comprises an asset owner field comprising a first value, and a second value, wherein the first value in the asset owner field of an object comprises an identification of an asset to be mapped to the object, and wherein the second value in the asset owner field of the object comprises an identification of a level of access the object should have on backups of the asset.

In an embodiment, each asset comprises a plurality of items backed up and indexed by the data protection application. In an embodiment, mappings of the assets to the one or more asset owners are stored by the directory service, and the backups of the assets are stored by the data protection application.

In another specific embodiment, there is a system comprising: a processor; and memory configured to store one or more sequences of instructions which, when executed by the processor, cause the processor to carry out the steps of: creating, by a data protection application, a plurality of backups corresponding to a plurality of assets, wherein each asset is mapped in a directory service to one or more asset owners, and the directory service is separate from the data protection application; receiving, at the data protection application, a search query from a user seeking to search the backups; consulting the directory service to identify assets having the user as an asset owner; generating a search filter comprising a list of the identified assets; applying the search filter to the search query to exclude from a search result backups of assets not having the user as the asset owner; and returning the search result to the user, the search result thereby comprising backups of assets having the user as an asset owner and excluding other backups of other assets not having the user as the asset owner.

In another specific embodiment, there is a computer program product, comprising a non-transitory computer-readable medium having a computer-readable program code embodied therein, the computer-readable program code adapted to be executed by one or more processors to implement a method comprising: creating, by a data protection application, a plurality of backups corresponding to a plurality of assets, wherein each asset is mapped in a directory service to one or more asset owners, and the directory service is separate from the data protection application; receiving, at the data protection application, a search query from a user seeking to search the backups; consulting the directory service to identify assets having the user as an asset owner; generating a search filter comprising a list of the identified assets; applying the search filter to the search query to exclude from a search result backups of assets not having the user as the asset owner; and returning the search result to the user, the search result thereby comprising backups of assets having the user as an asset owner and excluding other backups of other assets not having the user as the asset owner.

Illustrative embodiments of processing platforms will now be described in greater detail with reference to FIGS. 9, 10, and 11. Although described in the context of system 100, these platforms may also be used to implement at least portions of other information processing systems in other embodiments.

Figure 9:
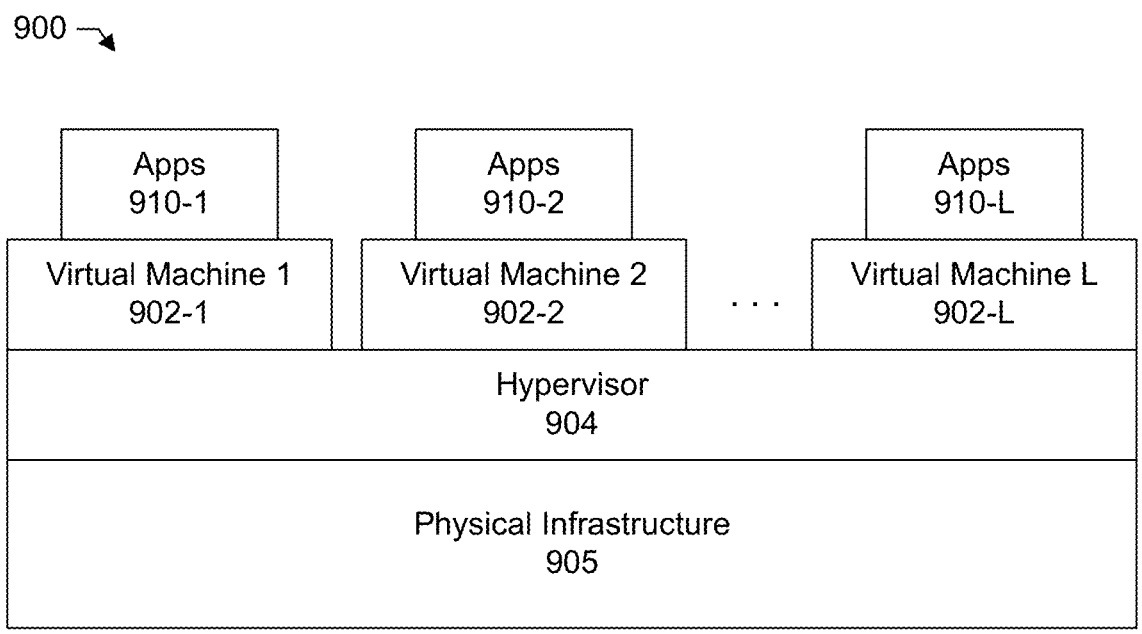
FIG. 9 shows a block diagram of a processing platform that may be utilized to implement at least a portion of an information processing system, according to one or more embodiments.
Figure 10:
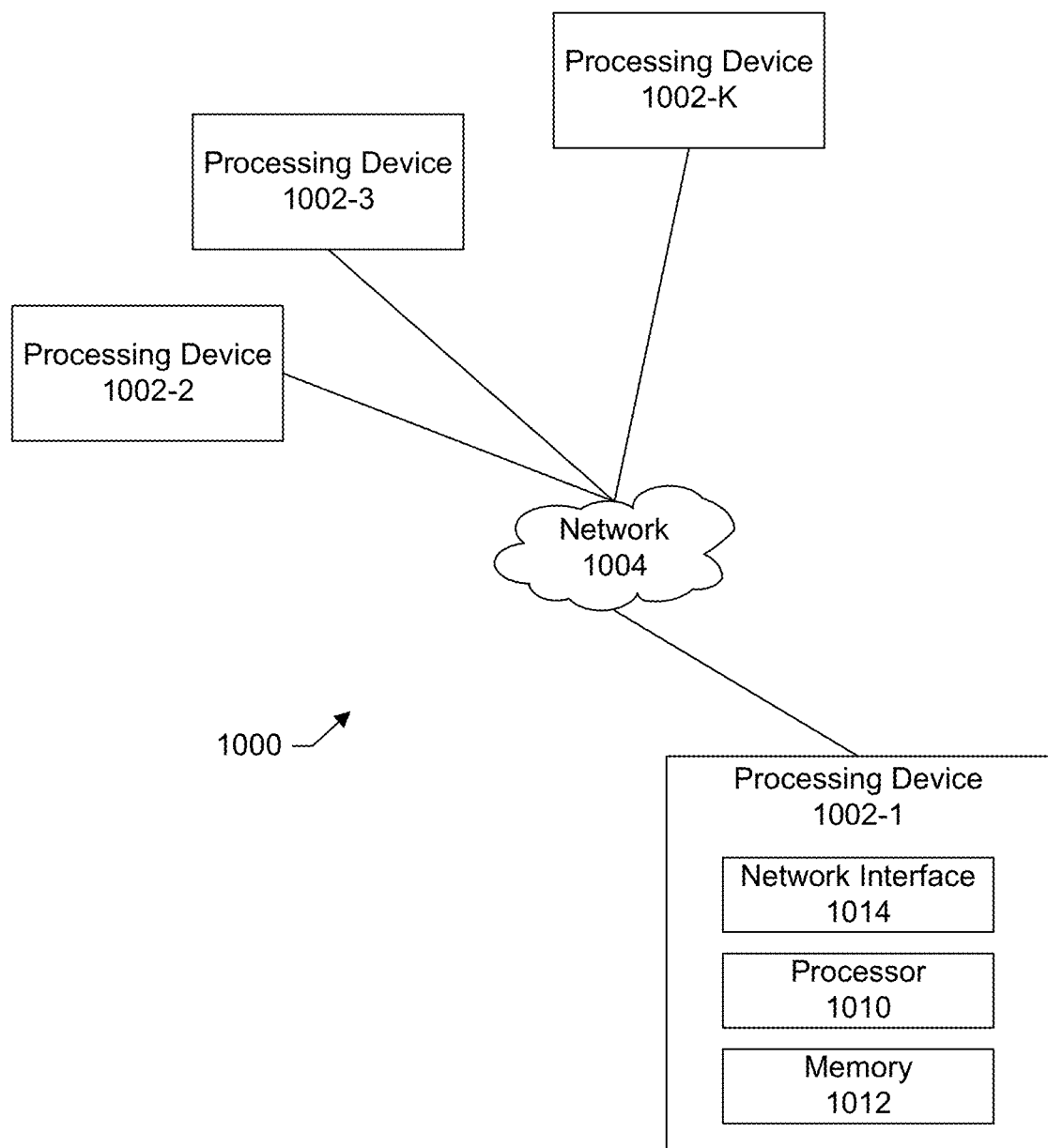
FIG. 10 shows another block diagram of a processing platform that may be utilized to implement at least a portion of an information processing system, according to one or more embodiments.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 11:
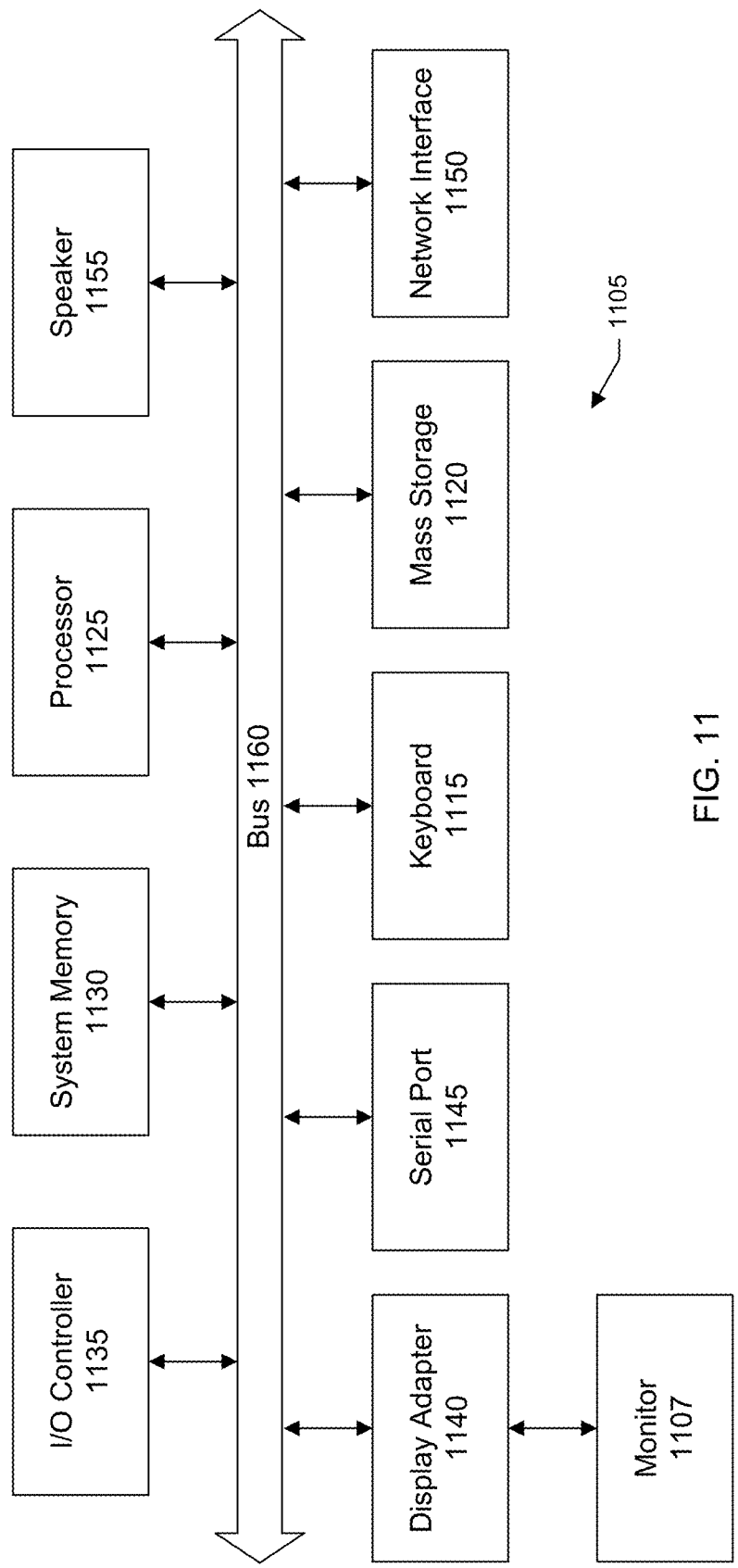
FIG. 11 shows a block diagram of a computer system suitable for use with the system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method comprising:
creating, by a data protection application, a plurality of backups for a plurality of assets, wherein each asset is mapped in a directory service to one or more asset owners, and the directory service is separate from the data protection application, wherein the directory service is a lightweight directory access protocol (LDAP) directory service of an organization, the mapping of an asset is stored within LDAP objects of the LDAP directory service, the LDAP objects correspond to users and user groups of the organization, and the mapping in an LDAP object comprises an identifier for the asset and a level of access granted to the LDAP object on backups of the asset;

receiving, at the data protection application, a search query from a user seeking to search the backups;

consulting, by the data protection application, the directory service to identify assets having the user as an asset owner;

generating a search filter comprising a list of the identified assets;

applying the search filter to the search query to exclude from a search result backups of assets not having the user as the asset owner; and returning the search result to the user, the search result thereby comprising backups of assets having the user as an asset owner and excluding other backups of other assets not having the user as the asset owner, wherein consulting the directory service comprises:

retrieving from the directory service a first list comprising first identifications of assets that have been mapped to an LDAP user object representing the user;

querying the directory service to identify LDAP group objects representing groups having the user as a member;

retrieving from the directory service for each identified LDAP group second identifications of assets that have been mapped to an LDAP group object representing a group having the user as a member; and combining the first and second identifications of assets to form the list of identified assets for the search filter.

2. The method of claim 1 further comprising:

enforcing, by the data protection application, the level of access granted to the LDAP object in the LDAP directory service on backups of the asset.

3. The method of claim 1 wherein each asset comprises a plurality of items backed up and indexed by the data protection application.

4. The method of claim 1 wherein mappings of the assets to the one or more asset owners are stored by the directory service, and the backups of the assets are stored by the data protection application.

5. The method of claim 1 wherein the level of access in the LDAP object indicates whether the LDAP object is permitted to restore a backup of the asset.

6. The method of claim 1 wherein the identifier for the asset comprises an Internet Protocol (IP) address, the level of access granted to the LDAP object on backups of the asset thereby applying to all items backed up from the IP address.

7. The method of claim 1 wherein the level of access comprises a first level of access that allows the LDAP object to view metadata of items in the backups of the asset, a second level of access that allows the LDAP object to view text content of the items in the backups of the asset, or a third level of access that allows the LDAP object to restore the backups of the asset.

8. A system comprising: a processor; and memory configured to store one or more sequences of instructions which, when executed by the processor, cause the processor to carry out the steps of:

creating, by a data protection application, a plurality of backups for a plurality of assets, wherein each asset is mapped in a directory service to one or more asset owners, and the directory service is separate from the data protection application, wherein the directory service is a lightweight directory access protocol (LDAP) directory service of an organization, the mapping of an asset is stored within LDAP objects of the LDAP directory service, the LDAP objects correspond to users and user groups of the organization, and the mapping in an LDAP object comprises an identifier for the asset and a level of access granted to the LDAP object on backups of the asset;

receiving, at the data protection application, a search query from a user seeking to search the backups;

consulting, by the data protection application, the directory service to identify assets having the user as an asset owner;

generating a search filter comprising a list of the identified assets;

applying the search filter to the search query to exclude from a search result backups of assets not having the user as the asset owner; and returning the search result to the user, the search result thereby comprising backups of assets having the user as an asset owner and excluding other backups of other assets not having the user as the asset owner, wherein the consulting the directory service comprises:

retrieving from the directory service a first list comprising first identifications of assets that have been mapped to an LDAP user object representing the user;

querying the directory service to identify LDAP group objects representing groups having the user as a member;

retrieving from the directory service for each identified LDAP group second identifications of assets that have been mapped to an LDAP group object representing a group having the user as a member; and combining the first and second identifications of assets to form the list of identified assets for the search filter.

9. The system of claim 8 wherein the processor further carries out the steps of:

enforcing, by the data protection application, the level of access granted to the LDAP object in the LDAP directory service on backups of the asset.

10. The system of claim 8 wherein each asset comprises a plurality of items backed up and indexed by the data protection application.

11. The system of claim 8 wherein mappings of the assets to the one or more asset owners are stored by the directory service, and the backups of the assets are stored by the data protection application.

12. The system of claim 8 wherein the LDAP directory service is an active directory managed by a network administrator of the organization.

13. A computer program product, comprising a non-transitory computer-readable medium having a computer-readable program code embodied therein, the computer-readable program code adapted to be executed by one or more processors to implement a method comprising:

creating, by a data protection application, a plurality of backups for a plurality of assets, wherein each asset is mapped in a directory service to one or more asset owners, and the directory service is separate from the data protection application, wherein the directory service is a lightweight directory access protocol (LDAP) directory service of an organization, the mapping of an asset is stored within LDAP objects of the LDAP directory service, the LDAP objects correspond to users and user groups of the organization, and the mapping in an LDAP object comprises an identifier for the asset and a level of access granted to the LDAP object on backups of the asset;

receiving, at the data protection application, a search query from a user seeking to search the backups;

consulting, by the data protection application, the directory service to identify assets having the user as an asset owner;
generating a search filter comprising a list of the identified assets;
applying the search filter to the search query to exclude from a search result backups of assets not having the user as the asset owner; and
returning the search result to the user, the search result thereby comprising backups of assets having the user as an asset owner and excluding other backups of other assets not having the user as the asset owner, wherein the consulting the directory service comprises:
retrieving from the directory service a first list comprising first identifications of assets that have been mapped to an LDAP user object representing the user;
querying the directory service to identify LDAP group objects representing groups having the user as a member;
retrieving from the directory service for each identified LDAP group second identifications of assets that have been mapped to an LDAP group object representing a group having the user as a member; and
combining the first and second identifications of assets to form the list of identified assets for the search filter.

14. The computer program product of claim 13 wherein the method further comprises:
enforcing, by the data protection application, the level of access granted to the LDAP object in the LDAP directory service on backups of the asset.

15. The computer program product of claim 13 wherein each asset comprises a plurality of items backed up and indexed by the data protection application.

16. The computer program product of claim 13 wherein mappings of the assets to the one or more asset owners are stored by the directory service, and the backups of the assets are stored by the data protection application.

17. The computer program product of claim 13 wherein the level of access in the LDAP object indicates whether the LDAP object is permitted to restore a backup of the asset.

* * * * *